United States Patent
Neale, III et al.

(10) Patent No.: US 6,406,194 B1
(45) Date of Patent: Jun. 18, 2002

(54) EXPANDING MOUNT SYSTEM FOR LIGHT EMITTING CABLE LEADS

(75) Inventors: Frank Thomas Neale, III, Warren; John H. Bakker, Cortland; George Raymond Herlinger, Niles, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/690,114

(22) Filed: Oct. 16, 2000

(51) Int. Cl.[7] .................................................. G02B 6/36
(52) U.S. Cl. ........................ 385/76; 385/137; 174/152 G
(58) Field of Search ........................ 385/33, 53, 76–79, 385/92–94, 137; 439/519–521, 556, 559; 174/152 G, 153 G, 65 G

(56) References Cited

U.S. PATENT DOCUMENTS

| | | | | |
|---|---|---|---|---|
| 5,331,357 A | * | 7/1994 | Cooley et al. .............. | 385/158 |
| 5,400,425 A | * | 3/1995 | Nicholas et al. .............. | 385/76 |
| 6,297,457 B1 | * | 10/2001 | Yamada et al. ......... | 174/152 G |
| 6,325,547 B1 | * | 12/2001 | Cammons et al. ............ | 385/76 |

* cited by examiner

*Primary Examiner*—Khiem Nguyen
(74) *Attorney, Agent, or Firm*—Thomas N. Twomey

(57) ABSTRACT

Described is an expanding mounting system for a light emitting cable lead having a cable lead and a lens housing encasing the lead. The housing and lead are routed through a hole in a panel from a bottom side. A mounting bezel is installed about the cable from above the panel. A slot within the bezel permits installation of the bezel on the cable from a radial direction. Closure of the slot thereby causes the installed bezel to encompass the cable. Rigidly attached to a bottom surface of the bezel are a plurality of ribs which are positioned to extend through the panel hole when the bezel bottom surface contacts the panel top side. Engagement of the housing within the bezel causes the ribs to expand thereby locking the bezel to the panel.

19 Claims, 3 Drawing Sheets

EXPANDING MOUNT SYSTEM FOR LIGHT EMITTING CABLE LEADS

TECHNICAL FIELD

The present invention pertains to an expanding mounting system for a cable lead. More particularly, this invention relates to an expanding mounting system for a light emitting cable lead.

BACKGROUND OF THE INVENTION

It is known to mount light indicators and displays on control and indicator panels. These light displays typically utilize a standard industry lens, bulb, socket, and wiring harness. The mounting device or socket for the bulb is typically attached to a panel prior to terminating the necessary cable leads to the sockets. Complex lighting arrays require a multitude of bulbs and associated wiring. The bulb itself is somewhat bulky so the ability to design a small unobtrusive display is hindered. In addition, the greater the number of bulbs used, the greater the chance of bulb failure, thereby, increasing warranty costs.

Assembly techniques often require that the panel be preassembled prior to installation in a vehicle. This is so because routing of power cables and termination of sockets requires assembling from behind the panel. Obvious manufacturing restrictions are created when easy access to the back of a panel is not available.

SUMMARY OF THE INVENTION

Accordingly, the present invention relates to an expanding mount system for light emitting cable leads which serve to produce a small, aesthetically unobtrusive light display. The cable lead is a fiber optic output. The necessary cable can be preassembled with a lens housing encasing the cable lead. The housing is secured to the cable by a crimp ring. Holes can be drilled into a panel from above. Since the panel can be installed prior to placement of the hole, manufacturing can be simplified. The cable lead is merely routed through the panel hole from underneath. A mounting bezel having a passage, centered longitudinally, is placed onto the cable from above the panel. A slot positioned on the bezel permits the radial positioning of the bezel onto the cable. A plurality of ribs are pivotally secured to and extend down from the bezel toward the panel. The bezel, with the ribs, are slid axially down the cable and secured within the panel hole. The cable is subsequently pulled back through the hole until the lens housing engages the bezel. Engagement of the housing to the bezel causes the plurality of ribs to pivot, circumferentially outward, thereby locking the bezel to the panel. A protrusion and a receptor arrangement between the housing and the bezel cause the housing to snap or lock into place with the bezel.

Thus an advantage of the present invention is the ability to install a light display from above a panel.

Another advantage of the present invention is the reduction of light bulbs. With fiber optic lighting, a single light source is utilized to illuminate many light indicators, thereby reducing manufacturing complexity and warranty costs.

Yet another advantage of the present invention is the elimination of complex power wiring to each light indicator. With fiber optics, only a single cable is routed to each light indicator without the use of bulbs at the leading end.

Still yet another advantage of the present invention is the aesthetically unobtrusive design of the lens housing and mounting bezel. The elimination of bulbs enables small, flush mounted panel light displays.

BRIEF DESCRIPTION OF THE DRAWINGS

These and other objects, advantages, and features of the present invention will be apparent to those skilled in the vehicle arts upon reading the following description with reference to the accompanying drawings, in which.

DETAILED DESCRIPTION OF THE PREFERRED EMBODIMENT

Figure 1:
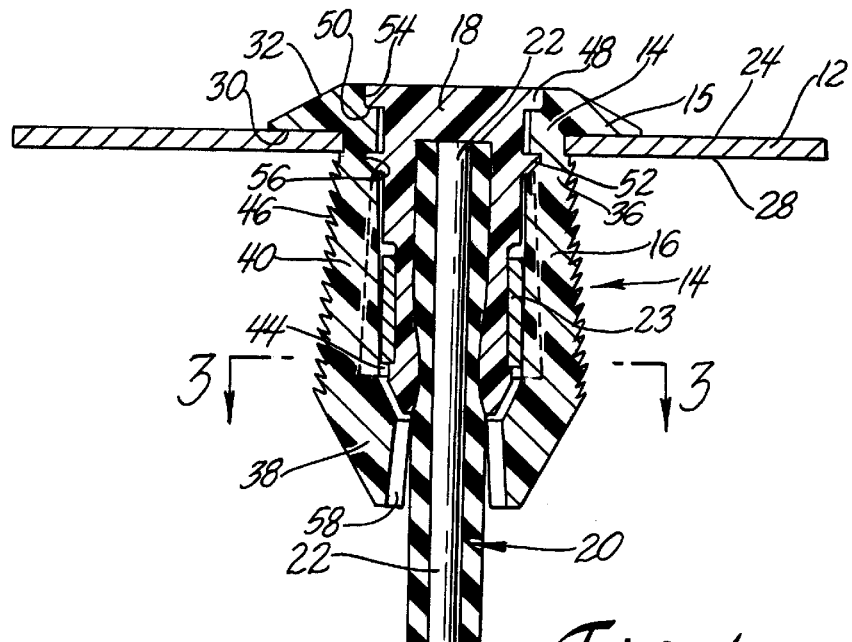
FIG. 1 shows a longitudinal cross-section of a light emitting cable lead mounting assembly, installed.

Referring now to FIG. 1 of the drawings light emitting cable lead mounting assembly 10 comprises a panel 12, a mounting bezel 14 having a flange 15 and a plurality of ribs 16, a lens housing 18, and a cable 20 having a lead 22. Lens housing 18 encases the lead 22. Housing 18 is secured to cable 20 by a crimp ring 23 and is disposed within the bezel 14. Bezel 14 is mounted to panel 12. Rigidly connected to the flange 15 is the plurality of ribs 16 which extend downward and through panel 12. Ribs 16 provide the means to secure and lock bezel 14 to the panel 12.

Figure 2:
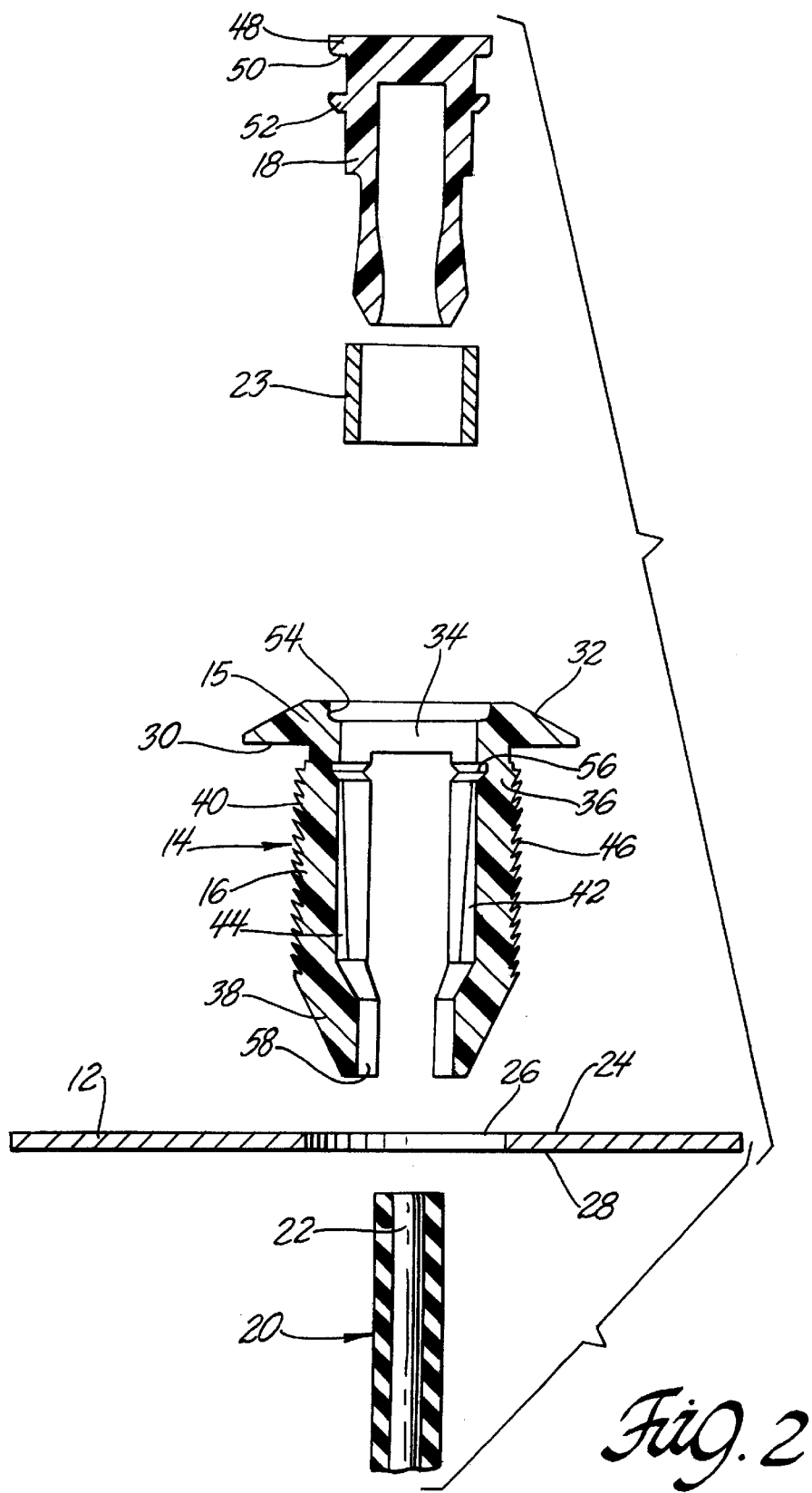
FIG. 2 shows a longitudinal cross-section exploded view of the light emitting cable lead mounting assembly.

Referring to FIG. 2, the panel 12 comprises a top side 24, a hole 26 and a bottom side 28. The perimeter of hole 26 is defined by top side 24 and extends through the bottom side 28. Top side 24 can be recessed (not shown) within panel 12 to permit a flush mount of the flange 15. Flange 15 comprises a bottom surface 30, a top surface 32 and a passage 34 which extends between and penetrates surface 30 and surface 32. The plurality of ribs 16 each have a pivot end 36 and a free end 38. The pivot end 36 is attached to the bottom surface 30 of flange 15 whereby ribs 16 are disposed substantially perpendicular from surface 30. When bezel 14 is installed on panel 12, surface 30 contacts top side 24 and the plurality of ribs 16 extend through hole 26.

Figure 3:
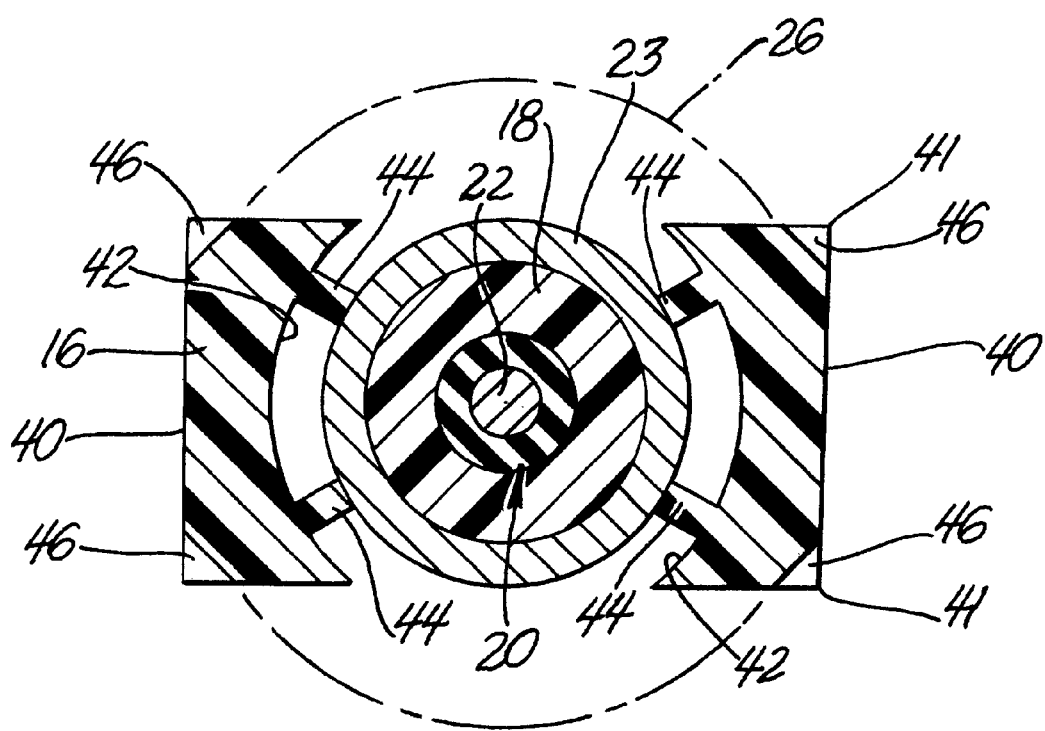
FIG. 3 shows a cross-sectional view of the light emitting cable lead mounting assembly taken substantially along the line 3—3 of FIG. 1 looking in the direction of the arrows.

Referring to FIG. 3, the plurality of ribs 16 each further have an outer side 40 and an inner side 42. Each outer side 40 is generally disposed radially outward, from cable 20. Each outer side 40 has at least one tooth 46 which serves to grip the bottom side 28 of panel 12 thereby securing the bezel 14 to the panel 12, as shown in FIG. 2. By increasing the number of teeth along the longitudinal length of the outer side 40, the mounting bezel 14 can be utilized on panels which vary in thickness. For instance, the panel thickness may range from 0.7 mm, for body sheet metal or trim cladding, up to 7.5 mm for molded plastic body and trim panels.

Referring to FIGS. 2 and 3, each inner side 42 is generally, and longitudinally, parallel to cable 20. And, each inner side 42 generally faces cable 20. Longitudinally disposed on each inner side 42 is at least one tapered member 44, as shown in FIGS. 2 and 3. The taper of each member 44 begins substantially near the pivot end 36, continuously tapering inward toward cable 20 as the member 44 nears the free end 38. Receipt of lens housing 18 against member 44 causes the plurality of ribs 16 to flare and pivot circumferentially outward thereby locking bezel 14 to panel 12.

Referring to FIG. 2, the lens housing 18 further comprises an expanded lens face 48 having a ridge surface 50, and at least one protrusion 52. In conjunction, the mounting bezel 14 further comprises a contact face 54 generally recessed within the top surface 32 of flange 15, and a receptor 56. When assembly 10 is engaged, the ridge surface 50 contacts face 54 creating a substantially flush surface at the top of assembly 10, and the protrusion 52 is seated within receptor 56 assuring that the assembly 10 does not disengage, as best shown in FIG. 1. Protrusion 52 can be interchanged with receptor 56 to achieve the same effect. However, this option is less desirable if receptor 56 also serves as a living hinge to assist in pivoting ribs 16 with flange 15. That is, the receptor 56 can be a groove located substantially between bottom surface 30 and pivot end 36, and generally within inner side 42. Such a receptor 56, as a groove, will enhance the pivot action of the rib 16.

As a passive feature, the free end 38 of rib 16 has an inward portion 58 which serves as a stress relief for lead 22 of cable 20. It is also apparent to one skilled in the art that lead 22 can be a fiber optic output or a light emitting diode, LED. The expanded lens face 48, the lens housing 18, the flange 15, the passage 34, and the hole 26 may take the form of any shape. For ease of manufacturing, however, the preferred embodiment is circular.

Referring to FIGS. 2 and 3, each outer side 40 further has two longitudinal edges 41 which extend from the pivot end 36 to the free end 38 of rib 16. The shape of outer side 40 is generally flat, as oppose to radial, even though the preferred embodiment of assembly 10 is circular. The flat shape of side 40 further assists in the pivot action of the ribs 16 about the preferred groove shape of receptor 56. This is so because more material would otherwise be required if side 40 were to conform to the circular shape of hole 26. Because side 40 is flat and the hole 26 is round, only the two edge 41 of each side 40 contacts hole 26. Consequently, on the preferred embodiment, the at least one tooth 46 is longitudinally disposed upon each edge 41 of side 40.

Figure 4:
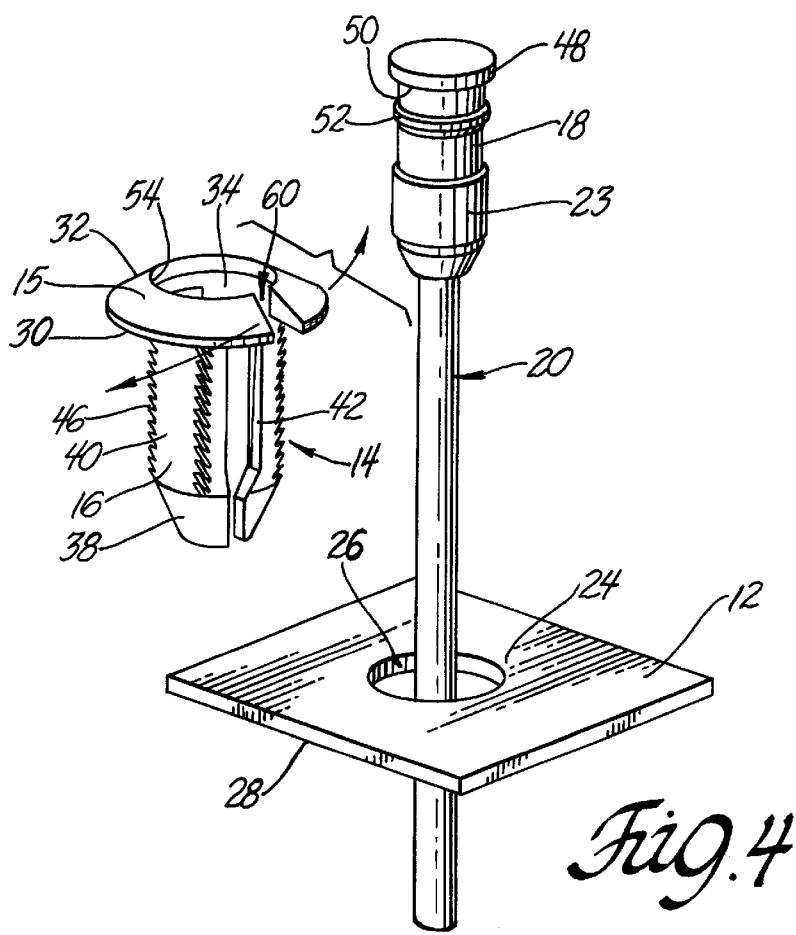
FIG. 4 shows an exploded perspective of the mounting assembly prior to placement of the mounting bezel about a cable.

Referring to FIG. 4, the flange 15 further has a slot 60 in communication with the passage 34. Like passage 34, the slot 60 extends through the top surface 32 and bottom surface 30 of flange 15. Whether slot 60 is open or closed as a natural state is predicated on the manufacturing and installation techniques of assembly 10. The present invention shows the slot 60 as normally closed. Therefore, slipping bezel 14 onto cable 20 from a radial direction requires one to force the slot 60 open. Slot 60 will then collapse upon itself, encompassing cable 20, when the force is released. This resultant position of bezel 14 requires no radial compression of bezel 14 while the bezel 14 is axially slid down cable 20 and into hole 26. Without any outward radial resilience while the bezel 14 is seated in hole 26, the at least one tooth 46 is required to hold the bezel 14 to the panel 12 prior to seating the housing 18 into the bezel 14. In the alternative, when the natural state of slot 60 is generally open, bezel 14 is easily slipped onto cable 20, but must be compressed prior to insertion into hole 26. When the compressive force is released, the bezel 14 will bias itself against the perimeter of hole 26, thereby securing itself to panel 12 without the need for at least one tooth 46.

To install assembly 10, the lens housing 18 is inserted over the lead 22, Housing 18 is then secured to cable 20 by the crimp ring 23, as best shown in FIG. 4. A hole 26 is either drilled or punched into panel 12. The lens housing 18, with the cable 20 trailing, is then extended through the hole 26. Slot 60 of flange 15 is then forced open so that bezel 14 is slid radially onto that portion of cable 20 located between the lead 22 and the panel 12. Once the cable is disposed within the passage 34 the force used to open slot 60 is released. The slot 60 then collapses in upon itself and the bezel 14 is slid axially down the cable 20 until the bottom surface 30 of flange 15 contacts the top side 24 of panel 12, and the at least one tooth 46 engages the bottom side 28 of panel 12, thereby securing bezel 14 to panel 12. The lens housing 18 is then pushed back toward panel 12 until the plurality of ribs 16 pivot circumferentially outward locking bezel 14 to panel 12, and at least one protrusion 52 of lens housing 18 engages receptor 56 of the plurality of ribs 16.

Whereas the bezel 14, described above, is molded with slot 60 normally closed, bezel 14 may also be molded with the slot 60 normally open. With this alternative, the bezel 14 is mounted to cable 20 without an expanding force. The bezel 14, however, must be compressed prior to mounting within hole 26. The resulting outward bias of slot 60 will then secure bezel 14 to panel 12. Depending on the force of the bias, the at least one tooth 46 may not be required to secure the bezel 14 to panel 12.

Although the preferred embodiments of the present invention have been disclosed, various changes and modifications may be made thereto by one skilled in the art without departing from the scope and spirit of the invention as set forth in the appended claims. It is also understood that the terms used herein are merely descriptive, rather than limiting, and that various changes may be made without departing from the scope and spirit of the invention.

We claim:

1. A light emitting cable lead mounting assembly comprising:
   a cable having a lead;
   a lens housing encasing the lead;
   a crimp ring securing the lens housing to the lead;
   a mounting bezel having a flange and a plurality of ribs, the flange having a top surface, a bottom surface and a passage, the passage penetrating the top and bottom surfaces, the housing disposed within the passage, the plurality of ribs each comprising:
      a pivot end attached to the bottom surface, the pivot ends concentrically disposed about the passage,
      a free end,
      an inner side extending from the pivot end to the free end, the inner side longitudinally opposed to the cable, the inner side having at least one tapered member emerging from the inner side at the pivot end and extending inward terminating at the free end, so that the free ends flare concentrically outward as the lens housing engages the tapered members thereby locking the bezel to the panel, and
      an outer side extending from the pivot end to the free end, the outer side having at least one tooth; and
   a panel having a bottom side, a hole, and a top side surrounding the hole, wherein the cable and the ribs extend through the hole, the at least one tooth engaged to the bottom side, and the bottom surface is in contact with the top side.

2. A light emitting cable lead mounting assembly as set forth in claim 1 wherein the flange further comprises a slot in communication with the passage, whereby the flange is discontinuous.

3. A light emitting cable lead mounting assembly as set forth in claim 1 further comprising:
   the inner side having a locking receptor located at the pivot end; and
   at least one locking protrusion located on the lens housing, the at least one locking protrusion engaging the locking receptor when the lens housing is fully inserted into the mounting bezel.

4. A light emitting cable lead mounting assembly as set forth in claim 3 wherein the at least one locking protrusion is a continuous rib extending from the housing, and the locking receptor is a groove, the groove forming a living hinge between the flange and the plurality of ribs.

5. A light emitting cable lead mounting assembly as set forth in claim 1 further comprising:

the top surface having a contact face, the face penetrated by the passage and recessed within the top surface; and an expanded lens face having a ridge surface, the lens face rigidly attached to the lens housing, whereby the lens face is flush with the top surface and the ridge surface contacts the contact face when the lens housing is fully inserted into the mounting bezel.

6. A light emitting cable lead mounting assembly as set forth in claim 5 wherein the expanded lens face, the lens housing, the flange, the passage, and the hole are cylindrical and concentrically located about the cable, wherein the outer side is flat, the outer side further having two edges in contact with the hole, the at least one tooth disposed on each edge.

7. A light emitting cable lead mounting assembly as set forth in claim 1 wherein the lens housing is clear plastic and the mounting bezel is pliable plastic.

8. A light emitting cable lead mounting assembly as set forth in claim 1 wherein the lead is a fiber optic output.

9. A light emitting cable lead mounting assembly as set forth in claim 1 wherein the lead is a light emitting diode.

10. A light emitting cable lead mounting assembly as set forth in claim 1 wherein each one of the free ends further have an inward portion which extends toward the cable thereby providing stress relief for the cable.

11. A method of assembling a light emitting cable lead mounting assembly comprising the steps of:

inserting a lens housing over a lead of a cable;

crimping a crimp ring about the lens housing thereby securing the housing to the lead;

extending the lens housing and the lead through a hole extending through a panel from a top side to a bottom side;

engaging a mounting bezel to the cable from a radial direction through a slot in a flange of the bezel into a passage so that the cable is located between the lens housing and the panel;

sliding the bezel axially along the cable until a bottom surface of the flange contacts a top side of the panel, and a plurality of ribs of the mounting bezel engage the bottom side of the panel; and pushing the lens housing back toward the panel until the plurality of ribs pivot circumferentially outward locking the bezel to the panel, and a protrusion engages a receptor to lock the lens housing in the bezel.

12. A light emitting cable lead mounting assembly comprising:

a cable having a lead;

a lens housing having at least one protrusion, the housing encasing the lead;

a crimp ring securing the housing to the lead;

a mounting bezel having a flange and a plurality of ribs, the flange comprising:
a top surface,
a bottom surface,
a passage penetrating the top and the bottom surfaces, the housing disposed within the passage, and
a slot in communication with the passage, the slot permitting installation of the bezel onto the cable, the plurality of ribs each comprising:
a pivot end attached to the bottom surface, the pivot ends concentrically disposed about the passage,
a free end,
an inner side extending from the pivot end to the free end, the inner side having a receptor and at least one tapered member, the receptor located at the pivot end and in receipt of the at least one protrusion when the lens housing is fully inserted into the mounting bezel, the at least one tapered member longitudinally secured to the inner side, the tapered member emerging from the inner side at the pivot end and extending inward terminating at the free end, the tapered members in contact with the lens housing when the lens housing is fully inserted into the mounting bezel, and
an outer side extending from the pivot end to the free end, the outer side having at least one tooth spaced longitudinally along the outer side; and a panel having a bottom side, a hole, and a top side surrounding the hole, the cable and the ribs extend through the hole, the at least one tooth engage the bottom side, the bottom surface in contact with the top side and the tapered members in contact with the lens housing thereby locking the bezel to the panel.

13. A light emitting cable lead mounting assembly as set forth in claim 12 wherein the at least one protrusion is a continuous rib extending from the housing, and the receptor is a groove, the groove forming a living hinge between the mounting bezel and the plurality of ribs.

14. A light emitting cable lead mounting assembly as set forth in claim 12 further comprising:

the top surface having a recessed contact face, the face penetrated by the passage; and an expanded lens face having a ridge surface, the lens face rigidly attached to the lens housing, whereby the ridge surface is disposed upon the contact face and the lens face is flush with the top surface of the mounting bezel when the lens housing is fully inserted into the mounting bezel.

15. A light emitting cable lead mounting assembly as set forth in claim 12 wherein each one of the free ends further have an inward portion which extend toward the cable thereby providing stress relief for the cable.

16. A light emitting cable lead mounting assembly as set forth in claim 12 wherein the expanded lens face, the lens housing, the mounting bezel, the passage, and the hole are cylindrical and concentrically located about the cable, wherein the outer side is flat, the outer side further having two edges in contact with the hole, the at least one tooth disposed on each edge.

17. A light emitting cable lead mounting assembly as set forth in claim 12 wherein the lens housing is clear plastic and the mounting bezel is pliable plastic.

18. A light emitting cable lead mounting assembly as set forth in claim 12 wherein the lead is a fiber optic output.

19. A light emitting cable lead mounting assembly as set forth in claim 12 wherein the lead is a light emitting diode.

* * * * *